Figure 1:
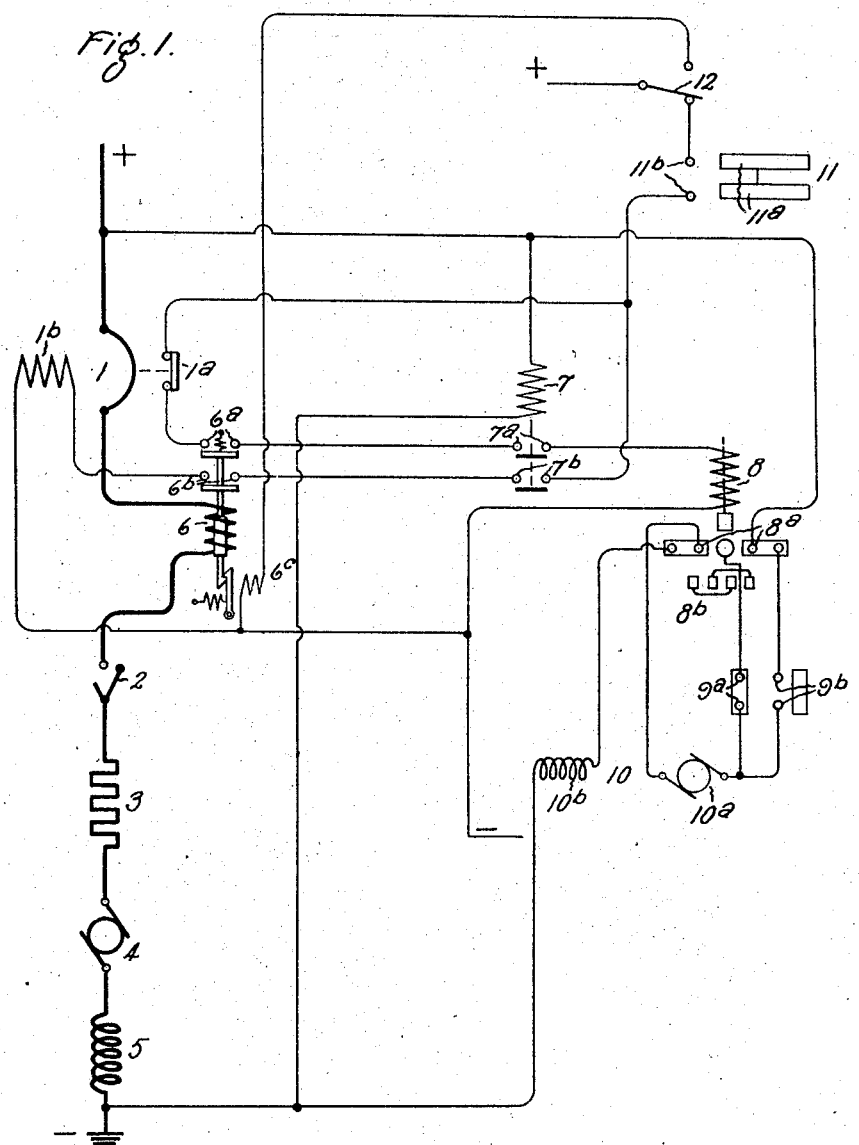

July 20, 1926.

H. C. HASTINGS

ELECTRIC MOTOR CONTROL

Filed Nov. 13, 1923

1,593,404

Contactors.

Inventor:
Hammond C. Hastings,
by
His Attorney.

Patented July 20, 1926.

1,593,404

UNITED STATES PATENT OFFICE.

HAMMOND CHARLES HASTINGS, OF RUGBY, ENGLAND, ASSIGNOR TO GENERAL ELECTRIC COMPANY, A CORPORATION OF NEW YORK.

ELECTRIC MOTOR CONTROL.

Application filed November 13, 1923, Serial No. 674,585, and in England December 15, 1922.

This invention relates to improvements in systems of electric motor control wherein the contactors for controlling the starting resistance and the series parallel connections of the motors are operated by cams mounted on a shaft.

According to the present invention, I utilize one or more of the cam operated contactors as circuit breakers, these circuit breakers being closed by cams on the cam shaft and retained in their closed position by means of shunt excited solenoids. One advantage of this arrangement is that the retaining solenoids for the contactors may be made much smaller than where the solenoid has to move the contactor to its closed position.

According to the present invention, the circuit breaker contactor is closed by the cam on the cam shaft, when in its off position, but this does not complete the main circuit of the motors, as a line contactor is provided which is only closed after the cam shaft has moved away from the off position and before this line contactor is closed, the cam which has closed the circuit breaker is moved out of contact with it so that the circuit breaker is free to open if its retaining coil is deenergized.

The cam or cams used for closing the circuit breakers never occupy a position which will interfere with the opening of the breakers for any position of the cam shaft in which the main circuit of the motors is closed, so that the circuit breaker is free to open should an overload occur during the starting or running. An overload relay is used with the circuit breaker, and this relay when operated by an overload is latched in its tripped position and is provided with contacts which will in this position, open the retaining coil of the breaker and arrest the forward operation of the cam shaft. The circuit breaker contactor is also used as the line contactor for opening the circuit whenever the master controller is returned to its off position, as this movement of the master controller will deenergize the retaining coil of the breaker. A motor may be provided for operating the cam shaft and the opening of the breaker causes the cam shaft to return to its off position, and again close the breaker. The main circuit is still open under these conditions, as the contactor which closes the line circuit has been opened by the cam shaft on returning to its off position.

When an overload occurs, if the master controller is still retained in one of the operative positions, such as a starting or running position, the breaker will trip and the cam shaft motor will run the cam shaft back to the off position, where it will remain until the overload relay has been reset. Contacts on the overload relay cause the forward running circuit of the cam shaft motor to open, when the relay is tripped so that the motor can only run to the off position until the relay has been reset. To reset this relay the control switch has to be opened, and thrown to the reset position, thus energizing the reset coil of the relay. Opening the control switch for this purpose causes the circuit breaker to be opened and the cam shaft to be returned to its off position, thus ensuring that the starting resistance will be in circuit when the motor is switched on again.

Where a no-voltage relay is included, contacts on this relay will cause the retaining coil circuit of the circuit breaker to be opened, when the no-volt coil of the relay is deenergized. The opening of the no-volt relay also causes the forward running circuit of the cam shaft motor to be opened and the cam shaft to return to the off position where it will remain owing to the forward running circuit of the cam shaft being opened even if the master controller is in one of its running positions.

To obtain the connection for causing the cam shaft motor to return to the off position, a relay operated by a shunt coil is provided for each equipment which relay when deenergized completes the return running circuit of the cam shaft motor. This relay is energized in all positions, but the off position of the master controller, and is deenergized and trips whenever the master controller is returned to its off position or the no-volt coil is deenergized. Contacts are provided on the cam shaft for opening the backward running circuit of the cam shaft motor, if the circuit breaker has been fully closed and the cam shaft is in its off position.

Figure 2:
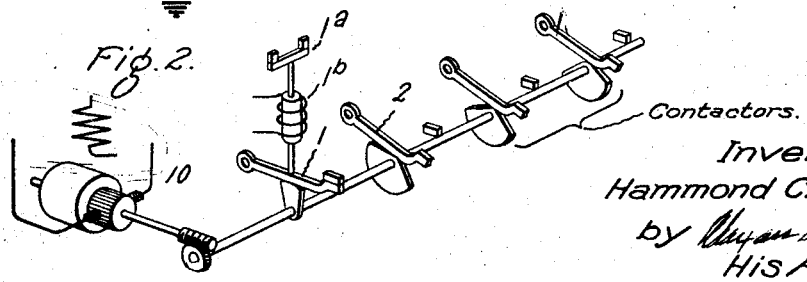

The accompanying diagram, Figure 1, illustrates one form of this invention. In order to simplify the diagram a single series motor only has been illustrated, and as many as possible of the resistance contactors have been omitted. Figure 2 is a detail showing a portion of the contactors operated by the pilot motor.

In the drawings. 1 represents the circuit breaker which is closed by the cam shaft, and is retained in its closed position by a shunt coil $1^b$. This circuit breaker has an auxiliary switch $1^a$, mechanically connected to it, so that it is closed when the circuit breaker closes. A line contactor 2 which is also operated by the cam shaft is shown in the main circuit of the motor. This contactor is closed after the cam which closes the circuit breaker 1 is moved past its operative position, so that the circuit breaker is free to open if necessary.

The main resistance, motor armature, and series field are shown diagrammatically at 3, 4 and 5 respectively. In the main circuit an overload relay 6 is provided having auxiliary contacts $6^a$, and $6^b$, and a resetting coil $6^c$ in a shunt circuit. A no-voltage relay 7 is also provided having two sets of auxiliary contacts $7^a$ and $7^b$.

The direction of rotation of the cam shaft motor is controlled by an auxiliary relay 8 and when the energizing coil of this relay is excited, the contacts are in a position to cause the motor to rotate the cam shaft to start up and run the main motor. When this coil is deenergized the contacts occupy a position which completes the circuit of the cam shaft motor for running it back to its off position.

The cam shaft carries cams which operate contacts $9^a$ and $9^b$. These contacts open the circuit of the cam shaft motor at the full on and off positions. $9^a$ opening the circuit at the full on position, when the motor has been running forward and $9^b$ opening the circuit at the off position when the cam shaft is returned far enough to completely close the circuit breaker 1.

The cam shaft motor is illustrated at 10, $10^a$ being the armature and $10^b$ the field. The master controller is shown at 11 and is provided with a control switch 12. This switch is shown as having two positions, one for supplying current through the master controller for normal running conditions, and the other for resetting the overload relay by means of resetting coil $6^c$. The relay 8 is energized for all positions of the master controller except the off position, but it is deenergized by tripping of the no-volt relay, the overload relay, or the circuit breaker.

In any of these cases, the relay contacts move to a position where they cause the cam shaft motor to return the cam shaft to the off position. The main circuit is always open on the contacts of the breaker 1 and closed on the contacts of the contactor 2.

The operation of the equipment will be understood from the foregoing description.

My invention is useful in the control of a train of cars operated by electric motors, wherein a controller located on one of the cars is utilized to govern control equipment on several of the cars of the train.

What I claim as new and desire to secure by Letters Patent of the United States, is:

1. In a system of motor control, a circuit breaker in the motor circuit, a magnet for retaining the circuit breaker in the closed position, a cam shaft controller arranged to mechanically close the said circuit breaker in the off position of the controller and release the same to be retained by the said magnet in operative positions of the controller, and a second circuit breaker included in series with the first circuit breaker in the motor circuit and arranged to be mechanically closed and maintained closed by the said controller only in operative positions of the controller.

2. In a system of motor control, a circuit breaker in the motor circuit, a magnet for retaining the circuit breaker in the closed position, a pilot motor, a cam shaft operated thereby and arranged to mechanically close the said circuit breaker in the off position of the controller and release the same to be retained by the said magnet in operative positions of the controller, a second circuit breaker included in series with the first circuit breaker in the motor circuit and arranged to be mechanically closed and maintained closed by the said controller only in operative position of the controller, and a relay energized to operate responsively to abnormal conditions in the motor circuit, connected to control the said first circuit breaker and control the energization of the said pilot motor to return the said cam shaft to the off position.

In witness whereof, I have hereunto set my hand this twenty ninth day of October, 1923.

HAMMOND CHARLES HASTINGS.